United States Patent
Brambilla et al.

(10) Patent No.: US 6,643,442 B2
(45) Date of Patent: Nov. 4, 2003

(54) OPTICAL WAVEGUIDES AND DEVICES INCLUDING SAME

(75) Inventors: Gilberto Brambilla, Hampshire (GB); Valerio Pruneri, Milan (IT); Laurence Reekie, Sydney (AU)

(73) Assignee: University of Southampton, Hampshire (GB)

(*) Notice: Subject to any disclaimer, the term of this patent is extended or adjusted under 35 U.S.C. 154(b) by 0 days.

(21) Appl. No.: 10/241,615

(22) Filed: Sep. 12, 2002

(65) Prior Publication Data

US 2003/0039459 A1 Feb. 27, 2003

Related U.S. Application Data

(63) Continuation of application No. PCT/GB01/01218, filed on Mar. 20, 2001.
(60) Provisional application No. 60/195,305, filed on Apr. 10, 2000.

(30) Foreign Application Priority Data

Mar. 23, 2000 (EP) ............................................. 00302381

(51) Int. Cl.$^7$ ............................... G02B 6/10; G02B 6/34
(52) U.S. Cl. ........................ 385/132; 385/142; 385/37
(58) Field of Search ................................. 385/123, 124, 385/129–132, 141, 142, 144, 37; 430/290; 65/385, 386, 390, 399; 501/37, 53–55

(56) References Cited

U.S. PATENT DOCUMENTS

| | | | |
|---|---|---|---|
| 4,314,031 A | * | 2/1982 | Sanford et al. ................. 501/44 |
| 4,472,030 A | * | 9/1984 | Tachibana et al. ........... 359/654 |
| 5,698,262 A | | 12/1997 | Soubeyrand et al. ...... 427/255.3 |
| 6,009,222 A | | 12/1999 | Dong et al. ................... 385/127 |
| 6,160,944 A | | 12/2000 | Payne et al. ................. 385/129 |
| 6,284,685 B1 | * | 9/2001 | Borrelli et al. ................ 501/45 |

FOREIGN PATENT DOCUMENTS

| | | |
|---|---|---|
| WO | WO 96/34304 | 10/1996 |
| WO | WO 99/18042 | 4/1999 |

OTHER PUBLICATIONS

Dong et al.; "Enhanced Photosensitivity in Tin–Codoped Germanosilicate Optical Fibers"; IEEE Photonics Technology Letters, vol. 7, No. 9, pp. 1048–1050, (1995).

Imamura et al.; "High Reliability Tin–Codoped Germanosilicate Fibre Bragg Gratings Fabricated by Direct Writing Method"; IEE Electronics Letters, vol. 34, No. 18, pp. 1772–1773, (1998).

Dong et al.; "Strong Photosensitive Gratings in Tin–Doped Phosphosilicate Optical Fibers"; Optical Society of America, Optics Letters, vol. 20, No. 19, pp. 1982–1984, (1995).

Brambilla et al.; "Photorefractive Index Gratings in $SnO_2$:$SiO_2$ Optical Fibres"; American Institute of Physics, Applied Physics Letters, vol. 76, No. 7, pp. 807–809, (2000).

Muneyuki et al.; "Soda Lime–Silica Photosensitive Glass and Its Production"; Patent Abstracts of Japan, of JP 08026767 A, Jan. 30, 1996.

Bansal et al.; "Handbook of Glass Properties" Academic Press, Inc., pp. 163, 583–584, (1986).

Mazurin et al.; "Handbook of Glass Data"; Elsevier, pp. 580–581, 584–585, 592–593, and 600–601, (1985).

* cited by examiner

Primary Examiner—Rodney Bovernick
Assistant Examiner—Sarah U Song
(74) Attorney, Agent, or Firm—Finnegan, Henderson, Farabow, Garrett & Dunner, L.L.P.

(57) ABSTRACT

Optical waveguides having a waveguide channel of photosensitive silica glass with a modified refractive index optically written therein, wherein the photosensitive glass comprises oxides of silicon, tin and at least one Group I element, where such optical waveguide devices include optical fiber gratings, optical fiber dispersion compensators, optical fiber sensors, optical fiber lasers, and planar waveguide devices.

82 Claims, 5 Drawing Sheets

OPTICAL WAVEGUIDES AND DEVICES INCLUDING SAME

This application is a continuation of PCT/GB01/01218 filed Mar. 20, 2001, which claims benefit of provisional No. 60/195,305 filed Apr. 10, 2000.

BACKGROUND OF THE INVENTION

The invention relates to optical waveguides comprising photosensitive glass, and to optical waveguide devices containing such glass, such as optical fiber gratings, optical fiber dispersion compensators, optical fiber sensors, optical fiber lasers and planar waveguide devices.

Photosensitivity of glass materials (i.e. change in refractive index by exposure to optical radiation) is a fundamental property for the realization of many optical devices. Typical glasses used for these applications are photosensitive to ultraviolet (UV) light. For example, Bragg gratings in optical fibers and planar waveguides have attracted much attention since their first demonstration. Bragg gratings are obtained by exposure of a waveguide made of photosensitive glass to a periodic light pattern. Such devices have many applications, such as sensors, dispersion compensators and laser mirrors.

The definition of channel waveguides using UV writing on glass substrates, such as silica on silicon, is also becoming increasingly important for the realization of multifunctional integrated optical components.

Telecommunications optical fibers, i.e. $SiO_2$ fibers with a low content of $GeO_2$ (~3%), show only relatively small refractive index changes when exposed to UV radiation. In addition, the UV photoinduced index change in standard germanosilicate waveguides is not sufficient for writing complex structures with a high degree of integration. With known photosensitive glasses, it is thus necessary to increase the photosensitivity of optical fibers or planar waveguides through post-fabrication methods and co-doping. Typical post-fabrication methods are hydrogen/deuterium loading and flame brushing. Typical co-dopants are $B_2O_3$, $SnO_2$ and rare earth elements. $SnO_2$ is used mainly as a codopant in germanosilicate, phosphosilicate and aluminosilicate glasses [see references 1,2,3,4]. Optical fiber with numerical apertures (NA) between 0.23 and 0.29 and refractive index modulations of ~$10^{-3}$ can be produced in this way.

Recently, optical fibers made from $SnO_2:SiO_2$ have been investigated [5]. Tin doped glass is also mentioned by other workers [6–8]). In reference [5], it has been shown that small concentrations (~0.15 mol %) of $SnO_2$ in a silica network give permanent refractive index changes with a high degree of photorefractivity. Under similar UV irradiation conditions, the degree of photorefractivity is nearly two orders of magnitude higher than the concentrations of $GeO_2$ required in $SiO_2:GeO_2$ fibers.

Compared to the above-mentioned post-fabrication and co-doping techniques, the use of $SnO_2$ has several potential attractions. It should keep the absorption low in the third telecom window at 1.5 µm. Processing is potentially less time consuming and potentially cheaper.

However, in practice, preparation of $SnO_2:SiO_2$ glasses is limited by the low solubility of Sn which crystallizes out of $SnO_2$ at concentrations greater than about 1 mol %. Inclusion of $SnO_2$ at higher concentration leads to a crystalline material which is not viable for realization of devices with low optical loss. Although non-crystalline photosensitive silica glass with $SnO_2$ concentrations of close to 1 mol % could potentially lead to the production of practical devices, the 1% solubility limit represents a major practical limitation, which limits the amount of photosensitivity (refractive index modulation) and the control of NA.

Another problem with the production of $SnO_2$ doped or co-doped fiber via modified chemical vapor deposition (MCVD) or solution doping techniques is related to the high volatility of $SnO_2$ at the temperature required for preform collapse. This problem effectively prevents high $SnO_2$ concentrations being incorporated into a fiber. An analogous problem can be expected to arise for other glass preparation processes.

It is therefore an aim of the invention to provide a photosensitive glass for fabricating fiber-optic and planar waveguides that allows tin oxide to be incorporated in a silica matrix at concentrations above its normal solubility limit of 1 mol %, and also that reduces the effects of high volatility during preform collapse or other glass preparation process.

SUMMARY OF THE INVENTION

It has been discovered that inclusion of a Group I element such as sodium in a tin-doped silica glass matrix provides a glass with highly desirable properties for use in waveguides, either made from optical fibers with the glass forming the core, or as part of a planar waveguide structure.

Accordingly, the invention provides an optical waveguide having a waveguiding channel of photosensitive glass with a modified refractive index optically written therein, wherein the photosensitive glass comprises an oxide of sodium or another Group I element such as lithium or potassium in a matrix of silicon and tin oxides. The optical waveguide may be an optical fiber, with the waveguiding channel being formed by a core of the optical fiber comprising the photosensitive glass. The optical waveguide may also be a planar waveguide device comprising a layer of the photosensitive glass with a waveguiding channel optically written into the layer. Integrated planar waveguide structures may thus be fabricated by writing a channel network into the photosensitive glass layer.

Inclusion of an oxide of a Group I element such as Na, Li or K can be used to increase the solubility of tin in the oxide up to 20 times above the 1 mol % limit of tin in the binary compound $SiO_2:SnO_2$ thereby allowing larger refractive index modulations to be achieved. In an embodiment of the invention, the glass comprises the oxides $SiO_2$, $SnO_2$ and $Na_2O$. The inclusion of sodium oxide with silica and tin oxide has been shown to produce a photosensitive glass with a highly desirable combination of properties.

A further advantage of inclusion of Na is that the effects related to high volatility of Sn during preform collapse are reduced.

Moreover, refractive index modulations optically written into the $SiO_2:SnO_2:Na_2O$ glass have been shown to have remarkable temperature stability, much superior to conventional $SiO_2:GeO_2$ glasses. It has been shown that the temperature stability is at least as good as that of the binary photosensitive glass $SiO_2:SnO_2$. Sodium oxide incorporation can thus be used to increase Sn concentration to increase intrinsic photosensitivity, while simultaneously providing a glass in which optically written refractive index modulations are highly stable.

The introduction of sodium oxide also does not cause any significant change in the background refractive index. This contrasts with other dopants (e.g. Ge or P) which might be suitable for increasing the solubility limit of Sn but which increase the background refractive index of the silicate glass to a much greater degree. For example, in conventional germanosilicate glass the background refractive index increases by about 0.002 per mol % of $GeO_2$ in $SiO_2$ (see reference 9). On the other hand, for sodium the increase is about 5 times less, being about 0.0004 per mol % for $Na_2O$ in $SiO_2$. This is an important advantage for sodium, because, if the refractive index is too high, it is difficult or impossible to manufacture optical fibers or planar waveguides that are compatible with current telecom fibers.

The photosensitive glass preferably comprises between about 1–20 mole % $SnO_2$ and 1–60 mole % $R_2O$ (where R=Na, K or Li) to lie within the solubility limit in a generally silica matrix. The photosensitive glass may comprise at least one of: 2, 5 or 10 mole % $SnO_2$ and/or at least one of: 2, 5, 10, 20, 30 or 40 mole % $R_2O$.

It will also be understood that the combination of tin and Group I oxides can be applied not only to pure silica glass, but also to silica doped with other elements, e.g. to germanosilicate glass, phosphosilicate glass or aluminosilicate glass, or combinations thereof. Additional rare earth dopants such as Er, Nd or Yb may also be included to provide gain. References to silica glass and a silica matrix are therefore to be construed as covering silica doped with other elements such as germanium, phosphorous or aluminum. Similarly references to a ternary compound are to be construed as inclusive of quaternary and higher order compounds.

The photosensitive glass may be used for many device applications. Specifically, an optical fiber can be provided that has a core made of the photosensitive glass. A planar waveguide comprising the photosensitive glass can also be provided. There can also be provided an optical device having a gain medium comprising the photosensitive glass, for example a laser, optical amplifier or light emitter. To provide gain in the photosensitive glass, suitable dopants such as the rare earth elements Er, Nd, Yb may be included. Moreover, a grating structure may be written into the photosensitive glass, as is described further below in the specific description.

Because of the remarkable stability of refractive index modulations optically written into the glass, devices made of the glass are more robust to intrinsic absorption, multi-photon absorption, high temperatures and other related effects which all tend to erase optically-written refractive index modulations.

Consequently, the glass is especially attractive for applications such as high power lasers and amplifiers where residual absorption effects or multiphoton absorption are typically large and where significant temperature increases may arise during operation. Since the refractive index modulations can withstand such high operating temperatures, devices incorporating the glass can be run hotter and at higher intensities. In this way cooling requirements are less stringent and devices can be run at higher output levels. More generally, the high temperature stability is indicative of a high characteristic activation energy for the photoinduced refractive index changes, which are thought to originate from electron trapping effects. Consequently, even if device operating temperatures are kept low by cooling or pulsed operation, high power devices incorporating a modulated refractive index profile optically written into the glass are expected to demonstrate enhanced stability. For example, device reliability and operating life are expected to be improved.

According to a further aspect of the invention there is provided an optical waveguide device comprising: an optical waveguide formed at least in part of photosensitive glass, wherein the photosensitive glass is doped with tin as a photosensitizing dopant; and a refractive index variation optically impressed on the photosensitive glass of the optical waveguide; wherein the photosensitive glass is doped additionally with a Group I element as a dopant for increasing solubility of tin in the glass.

According to another aspect of the invention there is provided a method of fabricating an optical waveguide, the method comprising: providing a photosensitive glass doped with tin as a photosensitizing dopant and a Group I element as a dopant for increasing solubility of tin in the photosensitive glass; and exposing regions of the photosensitive glass to refractive index change inducing optical radiation, the exposed regions providing a light-guiding core of raised refractive index within the photosensitive glass.

According to a still further aspect of the invention there is provided a process for increasing the sensitivity of optical glass to light-induced refractive index variations, the process comprising: doping the optical glass with tin as a photosensitizing dopant in combination with a Group I element as a further dopant for incorporating increased amounts of tin in the optical glass, thereby to increase the sensitivity of the optical glass to light induced refractive index variation; and exposing regions of the optical glass to varying optical radiation to modulate the refractive index of the optical glass.

BRIEF DESCRIPTION OF THE DRAWINGS

For a better understanding of the invention and to show how the same may be carried into effect reference is now made by way of example to the accompanying drawings in which.

DETAILED DESCRIPTION

An optical fiber was produced by collapsing a Suprasil (TM) cladding onto a small cylindrical glass core rod while pulling. The core was produced by melting powders of Na$_2$O, SiO$_2$ and SnO$_2$ in a Pt crucible at 1500° C. for 60 minutes. The glass was then consolidated at 1750° C. for 60 minutes. The molar composition of the powder used to produce the glass was: [SiO$_2$]=75%, [SnO$_2$]=5%, [Na$_2$O]= 20%. The glass was then cast and drilled with an ultrasonic drill. The cylinder (1.5 mm diameter and 50 mm height) was cleaned in an ultrasonic bath and etched in hydrofluoric acid (HF) to reduce the surface roughness. The refractive index was measured with an Abbe refractometer and found to be $n_{Na}$=1.52. The cladding (a Suprasil tube with OD=34 mm and ID=1.6 mm) was collapsed onto the core at 2000° C. whilst pulling the fiber. The fiber had OD=74 μm and 2$^{nd}$ mode cut-off at 1495 nm.

A grating for reflectivity at ~1.55 μm was written in the fiber using a pulsed KrF excimer laser (wavelength 248 nm) working at 30 Hz and a phase mask. Pulse duration and fluence were estimated to be 20 ns and 140 mJ/pulse*cm$^2$. The grating length was approximately 2 mm.

Figure 1:
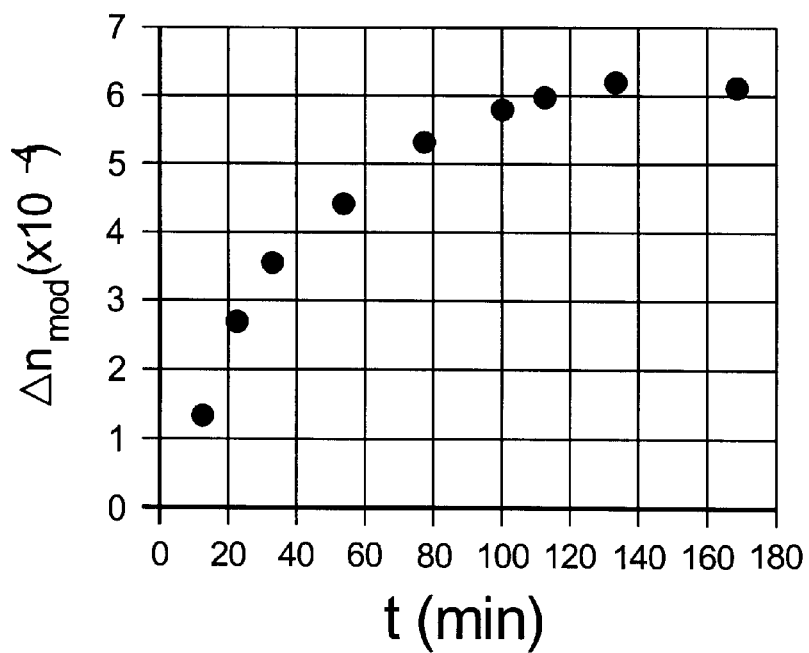
FIG. 1 shows refractive index modulation as a function of exposure time.

FIG. 1 shows the increase of the refractive index modulation with exposure time in minutes. A saturation level is reached at 6.2*10$^{-4}$ after 120 minutes exposure. Measurements at different intensities have been performed in order to understand whether the photosensitivity of this sample is driven by a one or two-photon absorption process.

Figure 2:
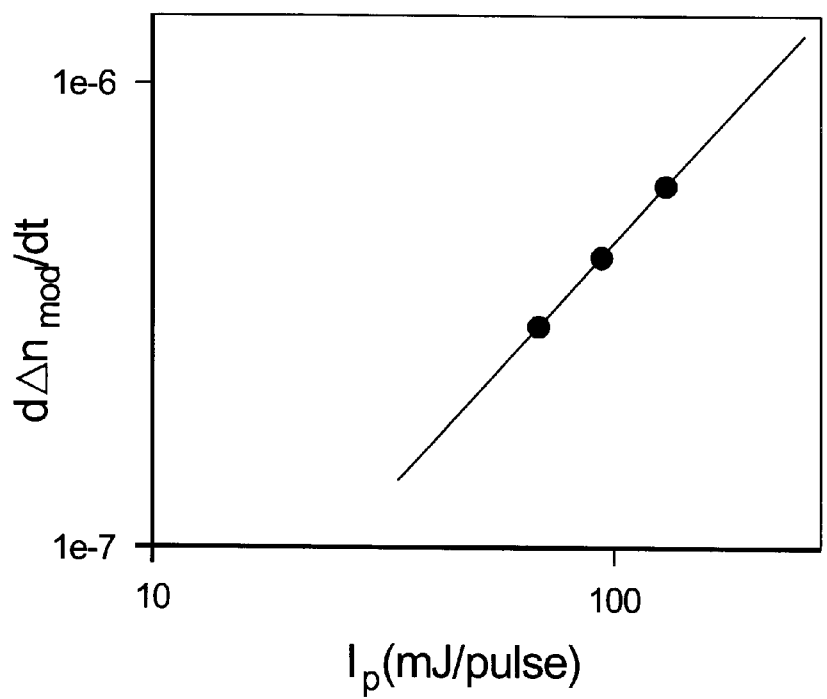
FIG. 2 shows the initial speed of refractive index modulation growth as a function of UV laser intensity in a glass according to an embodiment of the invention.

FIG. 2 shows the initial growth of the refractive index modulation as a function of laser intensity, which appears linear and has a gradient of 1.1. This is evidence that the photorefractive effect of the glass is based on a one-photon process.

Figure 3A:
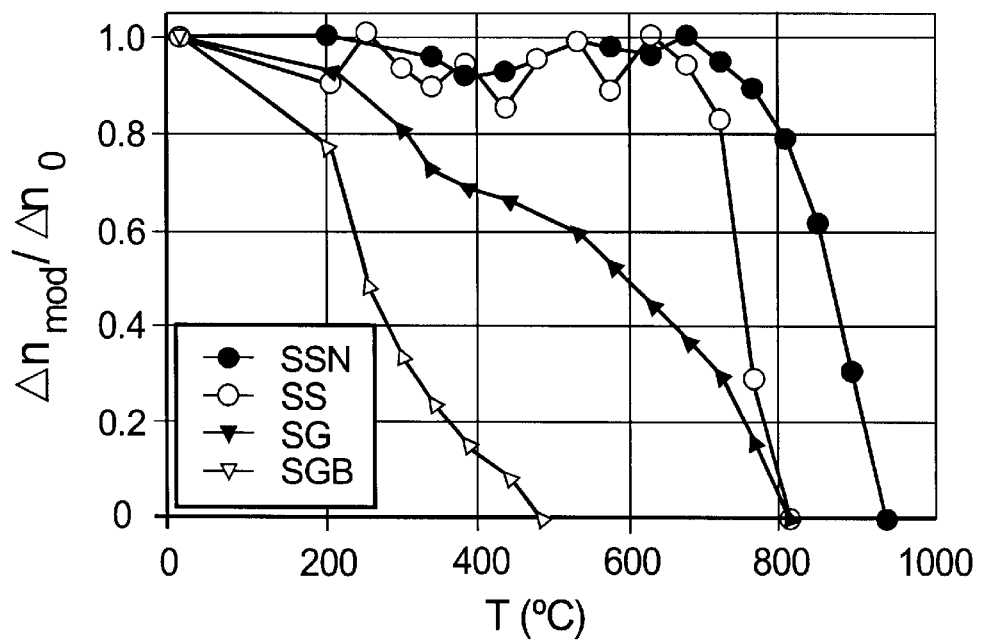
FIG. 3A shows temperature stability for gratings written in a glass according to an embodiment of the invention, and three further glasses, in terms of degradation of the amplitude of the gratings' refractive index modulation as temperature is increased.

FIG. 3A shows the results of temperature stability studies made on gratings written into photosensitive glass of four different composition types. The plot is of the amplitude of the refractive index modulation against temperature in degrees Celsius. The refractive index modulation at the temperature concerned is normalized to the initial refractive index modulation at 20° C. before heating. The refractive index modulation was measured in each case during step heating. The samples were heated first to 205° C. and then to higher temperatures in steps of about 45° C. Each temperature ramp took about 2 minutes and was followed by keeping the sample at a constant temperature for about 28 minutes, before increasing the temperature again with another step.

The four examples are gratings written in the Na$_2$O:SnO$_2$:SiO$_2$ glass (SSN2—filled circles), in comparison to gratings written in the SiO$_2$:SnO$_2$ glasses of reference [5] (SS—open circles), and those written in germanosilicate glass SiO$_2$:GeO$_2$ (SG—filled triangles) and borogermanosilicate glass SiO$_2$:GeO$_2$:B$_2$O$_3$ (SGB—open triangles). The enhanced stability of the gratings written into SnO$_2$:SiO$_2$ and Na$_2$O:SnO$_2$:SiO$_2$ as compared to germanosilicate and borogermanosilicate is striking. (At this point it should be emphasized that the remarkable thermal properties of SnO$_2$:SiO$_2$ binary glass is not known from reference [5], and is not believed to have been previously known elsewhere in the literature).

Figure 3B:
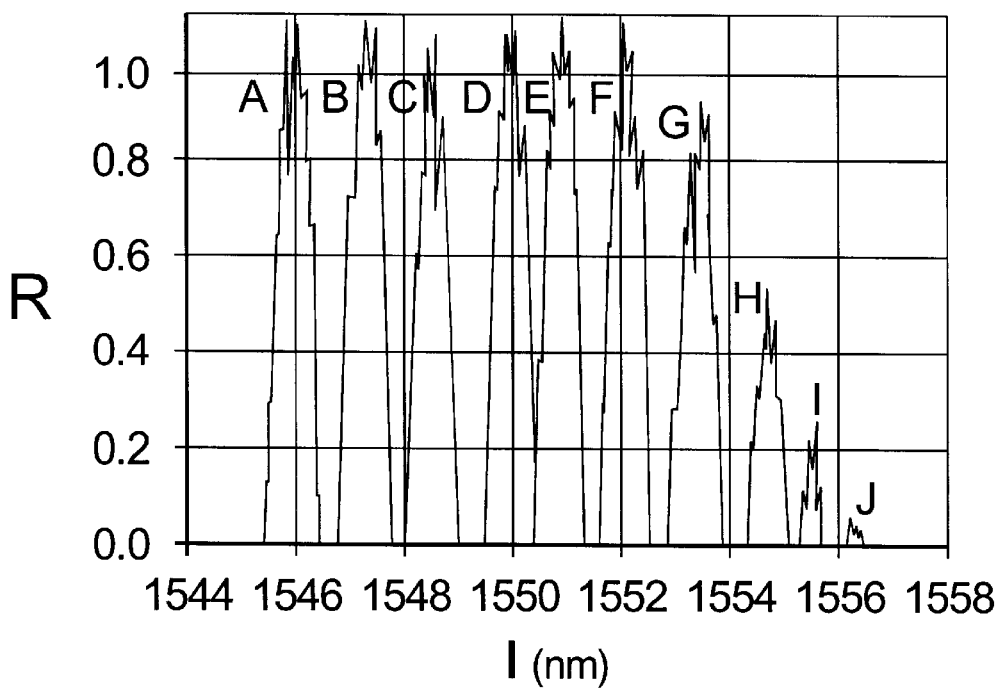
FIG. 3B shows temperature stability for the grating according to the embodiment of the invention shown in FIG. 3A in terms of reflection response as temperature is increased.

FIG. 3B shows the reflection response of the grating written into the Na$_2$O:SnO$_2$:SiO$_2$ glass at various different temperatures, the response curves being measured at points shown in FIG. 3A. In order of ascending peak wavelength (left-to-right in the figure), the response curves were taken at: 20 (A), 205 (B), 343 (C), 484 (D), 580 (E), 681 (F), 767 (G), 852 (H), 895 (I) and 940° C. (J), the peak response wavelength increasing gradually from around 1546 nm. As can be seen, the grating was stable up to and including the 681° C. measurement (response F at 1552 nm), with the first degradation being discernible at 767° C. (response G).

Figure 4:
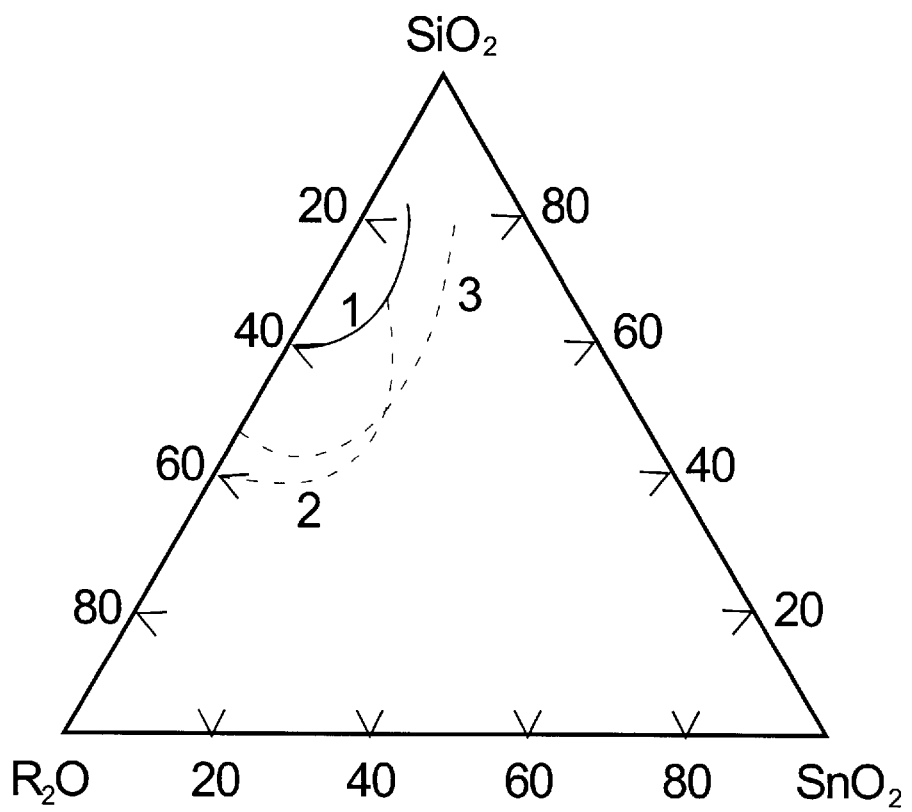
FIG. 4 shows solubility limits in the ternary compound $SnO_2:SiO_2:R_2O$ for the examples of R=Li (curve 1), R=Na (curve 2) and R=K (curve 3)

FIG. 4 is taken from reference [10] and shows the relation between the concentrations of the constituents in the ternary compounds SnO$_2$:SiO$_2$:R$_2$O where R is Li (curve 1) Na (curve 2) or K (curve 3). The curves represent the approximate concentration limits for crystallization. For all three Group I elements, the maximum concentration of SnO$_2$ for non-crystalline material is shown to be around 20 mol %. Inclusion of the Group I elements thus allows up to 20 times more Sn to be incorporated in a non-crystalline silica matrix. The concentrations which can be achieved for the Group I elements range from minimum values of perhaps around 10 mol % to maximum values of about 40% for Li and 60% for Na and K. For Na a preferred concentration range is between about 10 and 60 mol %. It will be understood that this curves apply only for a pure silica matrix. Different curves will apply if, for example, a germanosilicate matrix is used.

As described above, grating writing in ternary SiO$_2$:SnO$_2$:Na$_2$O fiber, achieving significant refractive index modulation, has been demonstrated.

From measurements of absorption on Sn doped/co-doped silica, it is expected that in the ternary SiO$_2$:SnO$_2$:Na$_2$O glass the absorption peak at around 250 nm will be situated at longer wavelengths compared to germanosilicate based glass. This could be useful for grating writing through a coating on an optical fiber (as the coatings are typically more transparent at longer UV wavelengths) and for using commercial laser sources (solid-state based) both via one-photon and two-photons processes.

In the above embodiments, the fiber is produced using rod-in-tube techniques, rather than MCVD as in previous work. It is thought this may be helpful for achieving high Sn concentrations. However, MCVD remains an option for low loss fibers where Sn solubility is increased by using Na via solution doping.

Although the above-described embodiment relates to UV writing of Bragg gratings in optical glass fibers and waveguides, the teachings herein may find general application for production of optical devices based on photosensitive glass where enhanced photorefractivity is required, for example in the definition of channel waveguides by UV writing. Some waveguide structures and devices incorporating such waveguides are now described with reference to FIGS. 5 to 10.

Figure 5:
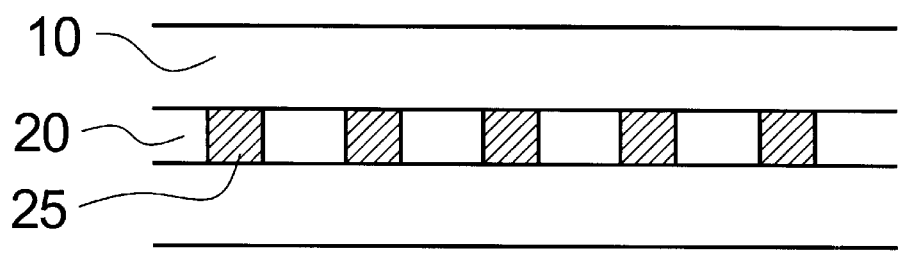
FIG. 5 shows a schematic cross-section of an optical fiber with a core of photosensitive glass in which has been written a refractive index modulation.

FIG. 5 shows in axial cross-section an optical fiber according to the above-described embodiment. The fiber comprises a core 20 of the photosensitive glass SnO$_2$:SiO$_2$:Na$_2$O in which is optically written a grating structure 25. The core is surrounded by a clad 10.

Figure 6:
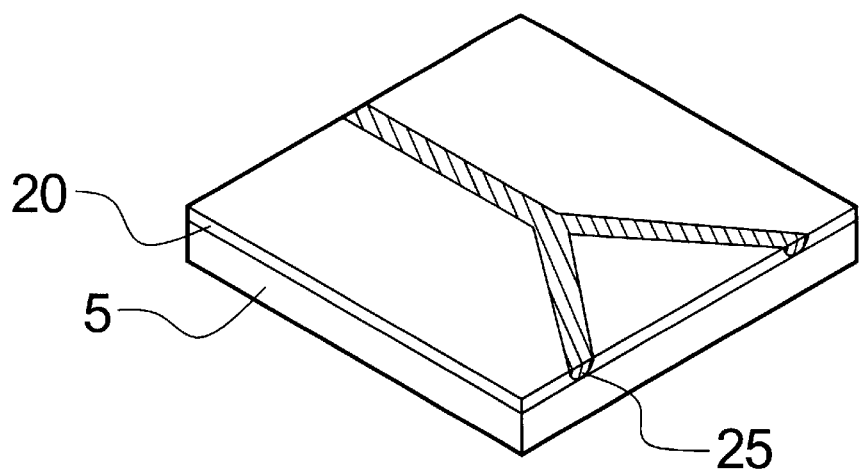
FIG. 6 shows in elevation a planar waveguide structure optically written onto the surface of an epitaxial or bulk layer of photosensitive glass.

FIG. 6 shows a planar waveguide structure 25 optically written into a layer 20 of the photosensitive glass SnO$_2$:SiO$_2$:Na$_2$O with a writing beam, or lithographically. The photosensitive glass layer 20 is deposited on a silica substrate 5. The waveguiding channel is written into the photosensitive glass layer 20 by focusing a light beam onto the surface of the layer.

Figure 7:
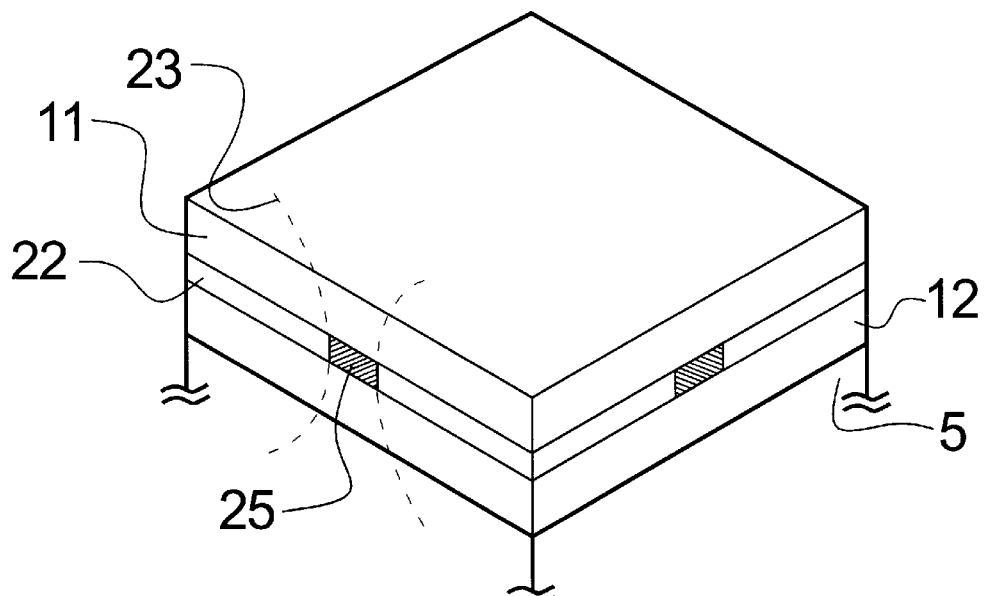
FIG. 7 shows in elevation a planar waveguide structure optically written into a layer of photosensitive glass sandwiched between a buffer layer and cap layer.

FIG. 7 shows a buried waveguide structure. A silica buffer layer 12 is deposited on a silicon substrate 5. A layer 22 of the photosensitive glass SnO$_2$:SiO$_2$:Na$_2$O is deposited on the buffer layer 12 with a further silica capping layer 11 being deposited on the photosensitive glass layer 22. A waveguiding channel 25 is written into the photosensitive glass layer 22 by focusing a light beam 23 so that the beam focus or waist is coincident with the layer 22.

Figure 8:
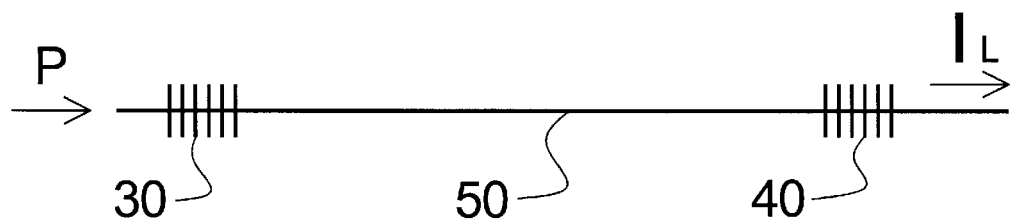
FIG. 8 shows an optical fiber laser with Bragg reflector cavity mirrors.
Figure 9:
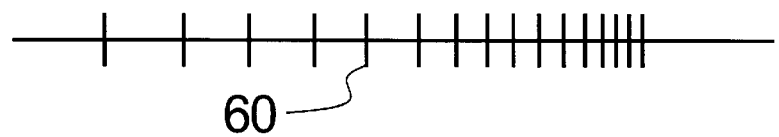
FIG. 9 shows a chirped grating.

FIG. 8 is a schematic drawing of an optical fiber laser. A laser cavity is defined by first and second Bragg gratings 30 and 40 optically written into an optical fiber with a core of the photosensitive glass $SnO_2:SiO_2:Na_2O$, as described with reference to FIG. 5. The gain medium 50 is also made of optical fiber, with the core being doped with Er or another suitable rare earth element such as Nd or Yb. The entire structure may be of a single fiber type, e.g. with a core of Er-doped $SnO_2:SiO_2:Na_2O$ glass. The photosensitive properties of the cavity core can then be utilized to fabricate a DFB (distributed feedback) laser. Alternatively, the Bragg gratings may be written into fiber sections with a core of $SnO_2:SiO_2:Na_2O$, with a separate fiber section being provided for the cavity. The cavity section will include a gain-inducing dopant such as a rare earth element, but need not include any photosensitizing dopants. In operation, a pump beam P is used to excite stimulated emission in the cavity to produce a laser output of wavelength $\lambda_L$. FIG. 9 shows a chirped fiber grating 60 with a core of the photosensitive glass $SnO_2:SiO_2:Na_2O$, as described with reference to FIG. 5. The chirped grating may be used as a dispersion compensator in long-haul fiber communication.

Figure 10:
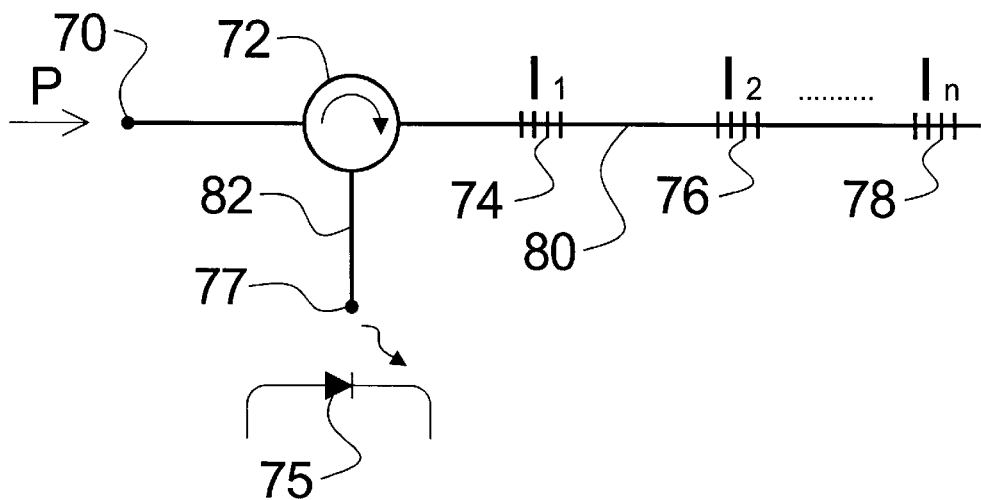
FIG. 10 shows an optical fiber sensor.

FIG. 10 shows an optical fiber sensor. A plurality of Bragg gratings 74, 76, 78 having respective characteristic reflection wavelengths $\lambda_1, \lambda_2 \ldots \lambda_n$ are arranged separated along a section of fiber 80, one end of which is connected to a circulator 72. The fiber comprises a core of the photosensitive glass $SnO_2:SiO_2:Na_2O$ into which the gratings are optically written. The circulator 72 is operable to route a probe light beam P from an input 70 through to the fiber section 80 and to route light reflected from the Bragg gratings to a further section of fiber 82 which leads to an output 77. Light from the output 77 is detected by a photodetector 75 and analyzed to determine from which of the Bragg gratings the light was reflected. Spectroscopic or time resolution techniques may be used for the analysis. The device is used as a sensor by placing each of the Bragg gratings at different locations, each of which experiences a different physical environment. Pressure, temperature or strain may for example be measured in this way.

REFERENCES

1. L. Dong, J. L. Cruz, L. Reekie, M. G. Xu, and D. N. Payne, IEEE Photonics Tech. Lett. 7, 1048 (1995).
2. K. Imamura, T. Nakai, Y. Sudo and Y. Imada, Electronics Lett. 34, 1772 (1998).
3. L. Dong, J. L. Cruz, J. A. Tucknott, L. Reekie, and D. N. Payne, Optics Lett. 20, 1982 (1995).
4. WO 96/34304, 'Optical Waveguide Device', by Dong et al.
5. G. Brambilla, V. Pruneri, and L. Reekie, Applied Phys. Lett. 76, 807 (2000).
6. JP 8026767 A, 'Soda lime-silica photosensitive glass and its production'.
7. WO 99/18042, 'Light-induced refractive index changes in low temperature glasses'.
8. U.S. Pat. No. 5,698,262, 'Method for forming tin oxide coating on glass'.
9. Bansal & Doremus "Handbook of Optical Glass Properties" Academic Press 1986 ISBN 0-12-078140-9 pages 163, 583 & 584
10. O. V. Mazurin, M. V. Streltsina, T. P. Shvaiko-Shvaikovskaya, "Handbook of Glass Data Part C Ternary Silicate Glasses", Elsevier, 1985-ISBN 0-444-42889-5 pages 581, 585, 592, 593 & 601.

What is claimed is:

1. An optical waveguide having a waveguiding channel of photosensitive silica glass with a modified refractive index optically written therein, wherein the photosensitive glass comprises oxides of silicon, tin and at least one Group I element.

2. A waveguide according to claim 1, including Na as the at least one Group I element.

3. A waveguide according to claim 1, including K as the at least one Group I element.

4. A waveguide according to claim 1, including Li as the at least one Group I element.

5. A waveguide according claim 1, wherein the photosensitive glass comprises at least 2 mole % $SnO_2$.

6. A waveguide according claim 1, wherein the photosensitive glass comprises at least 5 mole % $SnO_2$.

7. A waveguide according to claim 1, wherein the photosensitive glass comprises at least 10 mole % $SnO_2$.

8. A waveguide according to claim 1, wherein the photosensitive glass comprises $SiO_2$, $SnO_2$ and $R_2O$ where R is the at least one Group I element.

9. A waveguide according claim 8, glass comprises at least 2 mole % $R_2O$.

10. A waveguide according claim 8, wherein the photosensitive glass comprises at least 5 mole % $R_2O$.

11. A waveguide according claim 8, wherein the photosensitive glass comprises at least 10 mole % $R_2O$.

12. A waveguide according claim 8, wherein the photosensitive glass comprises at least 20 mole % $R_2O$.

13. A waveguide according claim 8, wherein the photosensitive glass comprises at least 30 mole % $R_2O$.

14. A waveguide according claim 8, wherein the photosensitive glass comprises at least 40 mole % $R_2O$.

15. A waveguide according to claim 8, wherein the photosensitive glass comprises between about 1–20 mole % $SnO_2$ and 1–60 mole % $R_2O$.

16. A waveguide according to claim 1, doped to provide a gain region.

17. A waveguide according to claim 16, wherein the gain region comprises a rare earth dopant.

18. A waveguide according to claim 17, wherein the rare earth dopant is at least one of Er, Nd and Yb.

19. A laser comprising a waveguide according to claim 18.

20. A laser according to claim 19, further comprising a pair of Bragg reflectors optically written into the photosensitive glass bounding at least a part of the gain region.

21. A laser comprising a waveguide according to claim 1, wherein the laser comprises a pair of Bragg reflectors optically written into the photosensitive glass which bounds a gain region formed in a further waveguiding channel of a further photosensitive glass.

22. A grating comprising a waveguide according to claim 1, the grating being defined by a modulated refractive index profile optically written into the photosensitive glass.

23. A dispersion compensator comprising a grating according to claim 22, the grating being a chirped grating.

24. A Bragg reflector comprising a grating according to claim 22.

25. A sensor comprising a plurality of Bragg reflectors according to claim 24 distributed along the waveguide, each Bragg reflector having a characteristic reflection response.

26. An optical fiber waveguide having a core of photosensitive silica glass with a modulated refractive index profile optically written therein, wherein the photosensitive glass of the core comprises oxides of silicon, tin and at least one Group I element.

27. A waveguide according to claim 26, including Na as the at least one Group I element.

28. A waveguide according to claim 26, including K as the at least one Group I element.

29. A waveguide according to claim 26, including Li as the at least one Group I element.

30. A waveguide according to claim 26, wherein the sensitive glass comprises at least 2 mole % $SnO_2$.

31. A waveguide according claim 26, wherein the photosensitive glass comprises at least 5 mole % $SnO_2$.

32. A waveguide according claim 26, wherein the photosensitive glass comprises at least 10 mole % $SnO_2$.

33. A waveguide according to claim 26, wherein the photosensitive glass comprises $SiO_2$, $SnO_2$ and $R_2O$ where R is the at least one Group I element.

34. A waveguide according to claim 33, wherein the photosensitive glass comprises at least 2mole $R_2O$.

35. A waveguide according claim 33, wherein the photosensitive glass comprises at least 5 mole % $R_2O$.

36. A waveguide according claim 33, wherein the photosensitive glass comprises at least 10 mole % $R_2O$.

37. A waveguide according claim 33, wherein the photosensitive glass comprises at least 20 mole % $R_2O$.

38. A waveguide according claim 33, wherein the photosensitive glass comprises at least 30 mole % $R_2O$.

39. A waveguide according claim 33, wherein the photosensitive glass comprises at least 40 mole % $R_2O$.

40. A waveguide according to claim 33, wherein the photosensitive glass comprises between about 1–20 mole % $SnO_2$ and 1–60 mole % $R_2O$.

41. A waveguide according to claim 26, doped to provide a gain region.

42. A waveguide according to claim 41, wherein the gain region comprises a rare earth dopant.

43. A waveguide according to claim 42, wherein the rare earth dopant is at least one of Er, Nd and Yb.

44. A laser comprising a waveguide according to claim 43.

45. A laser according to claim 44, further comprising a pair of Bragg reflectors optically written into the photosensitive glass bounding at least a part of the gain region.

46. A laser comprising a waveguide according to claim 26, wherein the laser comprises a pair of Bragg reflectors optically written into the photosensitive glass which bounds a gain region formed in a further waveguiding channel of a further photosensitive glass.

47. A grating comprising a waveguide according to claim 26, the grating being defined by a modulated refractive index profile optically written into the photosensitive glass.

48. A dispersion compensator comprising a grating according to claim 47, the grating being a chirped grating.

49. A Bragg reflector comprising a grating according to claim 47.

50. A sensor comprising a plurality of Bragg reflectors according to claim 49 distributed along the waveguide, each Bragg reflector having a characteristic reflection response.

51. A planar waveguide having a layer of photosensitive silica glass, the layer having at least one waveguiding channel of modified refractive index optically written therein, wherein the photosensitive glass of the layer comprises oxides of silicon, tin and at least one Group I element.

52. A waveguide according to claim 51, wherein the photosensitive glass layer is buried under a capping layer.

53. A waveguide according to claim 51, including Na as the at least one Group I element.

54. A waveguide according to claim 51, including K as the at least one Group I element.

55. A waveguide according to claim 51, including Li as the at least one Group I element.

56. A waveguide according to claim 51, wherein the photosensitive glass comprises at least 2 mole % $SnO_2$.

57. A waveguide according claim 51, wherein the photosensitive glass comprises at least 5 mole % $SnO_2$.

58. A waveguide according claim 51, wherein the photosensitive glass comprises at least 10 mole % $SnO_2$.

59. A waveguide according to claim 51, wherein the photosensitive glass comprises $SiO_2$, $SnO_2$ and $R_2O$ where R is the at least one Group I element.

60. A waveguide according to claim 51, wherein the photosensitive glass comprises at least 2 mole % $SnO_2$.

61. A waveguide according claim 59, wherein the photosensitive glass comprises at least 5 mole % $R_2O$.

62. A waveguide according claim 59, wherein the photosensitive glass comprises at least 10 mole % $R_2O$.

63. A waveguide according claim 59, wherein the photosensitive glass comprises at least 20 mole % $R_2O$.

64. A waveguide according claim 59, wherein the photosensitive glass comprises at least 30 mole % $R_2O$.

65. A waveguide according claim 59, wherein the photosensitive glass comprises at least 40 mole % $R_2O$.

66. A waveguide according to claim 59, wherein the photosensitive glass comprises between about 1–20 mole % $SnO_2$ and 1–60 mole % $R_2O$.

67. A waveguide according to claim 51, doped to provide a gain region.

68. A waveguide according to claim 67, wherein the gain region comprises a rare earth dopant.

69. A waveguide according to claim 68, wherein the rare earth dopant is at least one of Er, Nd and Yb.

70. A laser comprising a waveguide according to claim 69.

71. A laser according to claim 70, further comprising a pair of Bragg reflectors optically written into the photosensitive glass bounding at least a part of the gain region.

72. A laser comprising a waveguide according to claim go wherein the laser comprises a pair of Bragg reflectors optically written into the photosensitive glass which bounds a gain region formed in a further waveguiding channel of a further photosensitive glass.

73. A grating comprising a waveguide according to claim 51, the grating being defined by a modulated refractive index profile optically written into the photosensitive glass.

74. A dispersion compensator comprising a grating according to claim 73, the grating being a chirped grating.

75. A Bragg reflector comprising a grating according to claim 73.

76. A sensor comprising a plurality of Bragg reflectors according to claim 75 distributed along the waveguide, each Bragg reflector having a characteristic reflection response.

77. An optical waveguide device comprising:
   an optical waveguide formed at least in part of photosensitive silica glass, wherein the photosensitive glass is doped with tin as a photosensitizing dopant; and
   a refractive index variation optically impressed on the photosensitive glass of the optical waveguide;
   wherein the photosensitive glass is doped additionally with a Group I element as a dopant for increasing solubility of tin in the glass.

78. A device according to claim 77, wherein the Group I element is sodium.

79. A method of fabricating an optical waveguide, the method comprising:
   providing a photosensitive silica glass doped with tin as a photosensitizing dopant and a Group I element as a dopant for increasing solubility of tin in the photosensitive glass; and
   exposing regions of the photosensitive glass to refractive index change inducing optical radiation, the exposed regions providing a light-guiding core of raised refractive index within the photosensitive glass.

80. A method according to claim 79, wherein the Group I element is sodium.

81. A process for increasing the sensitivity of silica optical glass to light-induced refractive index variations, the process comprising:

doping the optical glass with tin as a photosensitizing dopant in combination with a Group I element as a further dopant for incorporating increased amounts of tin in the optical glass, thereby to increase the sensitivity of the optical glass to light induced refractive index variation; and exposing regions of the optical glass to varying optical radiation to modulate the refractive index of the optical glass.

82. A process according to claim 81, wherein the Group I element is sodium.

* * * * *